United States Patent [19]

Cane et al.

[11] Patent Number: 5,330,665
[45] Date of Patent: Jul. 19, 1994

[54] PRODUCTION OF EITHER AN ALKALINE EARTH METAL ALKYL PHENATE OR A SULPHURISED ALKALINE EARTH METAL ALKYL PHENATE

[75] Inventors: Charles Cane; Anthony Garner, both of Hull, United Kingdom

[73] Assignee: BP Chemicals (Additives) Limited, London, England

[21] Appl. No.: 713,084

[22] Filed: Mar. 18, 1985

Related U.S. Application Data

[63] Continuation of Ser. No. 494,307, May 13, 1983, abandoned.

[30] Foreign Application Priority Data

May 22, 1982 [GB] United Kingdom ............ 8215014
Jul. 22, 1982 [GB] United Kingdom ............ 8221268

[51] Int. Cl.$^5$ ............................................ C10M 159/22
[52] U.S. Cl. .................................... 252/25; 252/42.7; 252/39
[58] Field of Search ....................... 252/18, 25, 42.7

[56] References Cited

U.S. PATENT DOCUMENTS

| | | | |
|---|---|---|---|
| Re. 26,811 | 3/1970 | Cohen | 252/42.7 X |
| 3,036,971 | 5/1962 | Otto | 252/42.7 |
| 3,044,961 | 7/1962 | Morway et al. | 252/42.7 X |
| 3,172,855 | 3/1965 | Rogers et al. | 252/18 X |
| 3,256,186 | 6/1966 | Greenwald | 252/18 X |
| 3,282,835 | 11/1966 | Asseff | 252/18 X |
| 3,493,516 | 2/1970 | Allphin, Jr. et al. | 252/18 X |
| 3,544,463 | 12/1970 | Koft . | |
| 3,755,170 | 8/1973 | Rogers et al. | 252/42.7 X |

Primary Examiner—Jacqueline V. Howard
Attorney, Agent, or Firm—Brooks Haidt Haffner & Delahunty

[57] ABSTRACT

Alkaline earth metal alkyl phenates are produced by reacting at elevated temperature, in the presence or absence of sulphur, an alkyl phenol with an alkaline earth metal base in the presence as solvent of either an alkylene or polyalkylene alkyl ether of formula $R(OR^1)_xOR^2$ wherein R is $C_1$ to $C_6$ alkyl, $R^1$ is alkylene, $R^2$ is hydrogen or $C_1$ to $C_6$ alkyl and x is an integer in the range 1 to 6 and as catalyst an inorganic halide, preferably a hydrogen halide, an ammonium halide, an alkaline earth metal halide, a zinc halide or an aluminum halide. It is preferred to add an acid. Furthermore, carbon dioxide is preferably incorporated in the phenate.

20 Claims, No Drawings

PRODUCTION OF EITHER AN ALKALINE EARTH METAL ALKYL PHENATE OR A SULPHURISED ALKALINE EARTH METAL ALKYL PHENATE

This application is a continuation of application Ser. No. 494,307, filed May 13, 1983 now abandoned.

The present invention relates to a process for the production of either an alkaline earth metal alkyl phenate or a sulphurised alkaline earth metal alkyl phenate. In particular, the invention relates to the production of "overbased" alkyl phenates and to lubricating oil compositions containing them.

In the internal combustion engine, by-products from the combustion chamber often blow by the piston and admix with the lubricating oil. Many of these by-products form acidic materials within the lubricating oil. This is particularly marked in diesel engines operating on low-grade fuels of high sulphur content wherein corrosive acids are produced by combustion. The acids thereby incorporated in the lubricating oil can include sulphur acids produced by oxidation of sulphur, hydrohalic acids derived from halogen lead scavengers in the fuel and nitrogen acids produced by the oxidation of atmospheric nitrogen within the combustion chamber. Such acids cause deposition of sludge and corrosion of the bearings and engine parts leading to rapid wear and early breakdown of the engine.

One class of compounds generally employed to neutralise the acidic materials and disperse sludge within the lubricating oil are the metal alkyl phenates and sulphurised metal alkyl phenates, wherein the metal is an alkaline earth metal such as calcium, magnesium or barium. Both "normal" and "overbased" alkaline earth metal alkyl phenates have been employed. The term "overbased" is used to describe those alkaline earth metal alkyl phenates in which the ratio of the number of equivalents of the alkaline earth metal moiety to the number of equivalents of the phenol moiety is greater than one, and is usually greater than 1.2 and may be as high as 4.5 or greater. In contrast, the equivalent ratio of alkaline earth metal moiety to phenol moiety in "normal" alkaline earth metal alkyl phenates is one. Thus, the "overbased" material contains greater than 20% in excess of the alkaline earth metal present in the corresponding "normal" material. For this reason "overbased" alkaline earth metal alkyl phenates have a greater capability for neutralising acidic matter than do the corresponding "normal" alkaline earth metal alkyl phenates. The present invention embraces the production of both the "normal" and the "overbased" materials.

The prior art teaches many methods for preparing both "normal" and "overbased" metal alkyl phenates. One such method for preparing "overbased" alkyl phenates generally referred to as the "single lime addition" process comprises reacting an alkyl phenol, in the presence or absence of sulphur, a hydroxylic compound and excess alkaline earth metal hydroxide (above the stoichiometric proportion required to neutralise the alkyl phenol), to form an intermediate product, followed by carbonation, a heading distillation (to remove unreacted hydroxylic compound) and filtration. The production of intermediate product is accompanied by a marked increase in viscosity while the subsequent carbonation reduces the viscosity to a relatively low level. The increase in viscosity accompanying the formation of the intermediate product is undesirable because the reaction mixture becomes difficult to agitate to the detriment of subsequent reactions. Whilst this increase in viscosity may be controlled to an acceptable level by incorporation of less alkaline earth metal hydroxide in the reaction, the overbased alkyl phenate product necessarily possesses a reduced neutralisation capacity. In order to achieve a high neutralisation capacity product and at the same time control the viscosity of the intermediate product within acceptable limits, the alkaline earth metal hydroxide may be added in two, (generally referred to as the "double lime addition" process) or three separate reaction steps, with sequential carbonation steps. However this method involves relatively long batch times. Another alternative is to use viscosity depressants, such as tridecanol, in the production of the intermediate product but such an expedient increases the raw material cost of the process. The hydroxylic solvent generally employed is ethylene glycol, which can be consumed in side reactions with sulphur producing increased amounts of undesirable hydrogen sulphide.

Other solvents have been employed in the process. Thus the complete specification of GB 1,391,847 (Continental Oil Company) describes and claims a process for preparing highly basic magnesium, calcium or barium salts of alkylphenols or sulphurised alkylphenols wherein the process comprises:

(a) forming an admixture of
  (i) 3 to 80 parts by weight an alkylphenol represented by the formula $Ar(OH)(R_n)$ 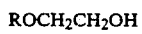

wherein Ar represents an aromatic residue, R is a straight or branched chain saturated or unsaturated, aliphatic hydrocarbon radical having from 4 to 30 carbon atoms, and n is an integer, having a value of 1 or 2, with the proviso that the total number of carbon atoms in $R_n$ is from 8 to 40, or sulphurised alkyl phenols made from the aforesaid alkylphenols,
  (ii) from 0.10 to 95 parts by weight of a non-volatile diluent oil having a boiling point in excess of 200° C.,
  (iii) from 0.5 to 250 parts by weight of a volatile process solvent having a boiling point below 150° C., and
  (iv) from 0.2 to 14 parts by weight of water;
(b) while the temperature is in the range of 20° to 55° C. adding to the admixture of step (a) an overbasing amount of a glycol ether solution of magnesium, calcium or barium, said glycol ether being represented by the formula $ROCH_2CH_2OH$ wherein R is a $C_1$ to $C_6$ alkyl group or by the formula $HOCH_2CH_2OCH_2CH_2OR$ 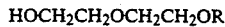

where R is a $C_1$ to $C_4$ alkyl group,
(c) while maintaining the admixture at a temperature higher than in step (b) and in the range of 55° to 100° C. adding thereto a neutralising amount of a glycol solution of magnesium, calcium or barium, wherein
  (i) the cation is the same as in step (b), and
  (ii) the glycol ether is as defined in step (b); and (d) removing the volatile materials by heating, said process being characterised further in that
  (i) the overbasing amount of glycol ether solution of magnesium, calcium or barium is from 0.1 to 5 equivalents per equivalent of alkyl phenol or sulphurised alkyl phenol,
  (ii) the total amount of magnesium, calcium or barium in the glycol ether solution added in the process is from 0.4 to 10 parts by weight in the case of magnesium, and is from 0.4 to 50 parts by weight in the case of calcium or barium, and
  (iii) the amount of water in step (a) (iv) is sufficient to provide 1.0 to 2.5 moles per mole of dispersed magnesium, calcium or barium.

It is also known to use a solvent other than ethylene glycol in combination with a promoter. Thus U.S. Pat. No. 34,107,898 (The Lubrizol Corporation) describes and claims a method for the preparation of an oil-soluble, basic, sulphurised alkaline earth metal phenate which comprises reacting, at a temperature above 150° C., (A) a phenol, (B) sulphur, and (C) an alkaline earth base, in the presence of a promoter comprising (D) about 5-20 mole percent, based on the amount of component (A) of a carboxylic acid or an alkali metal, alkaline earth metal, zinc or lead salt thereof and (E) as a solvent, a compound of the formula $R(OR^1)_xOH$, wherein R is hydrogen or alkyl, $R^1$ is alkylene and x is an integer which is at least 2 if R is hydrogen and at least one if R is alkyl, said component E having a boiling point above 150° C.; the ratio of the number of equivalents of component B to component A being between about 1:1 and 2:1 and the ratio of the number of equivalents of component C to component A being at least about 2:1, and subsequently removing all volatile components from the reaction product.

The objective of the processes described in the aforesaid U.S. Pat. No. 3,410,798 and GB 1391847 is to increase the amount of alkaline earth metals in the alkyl phenate products so-produced. We have now found that a high degree of "overbasing" can be achieved by using a combination of a polyalkylene glycol alkyl ether or an alkylene glycol alkyl ether as solvent and an inorganic halide as promoter or catalyst. This combination can lead to other useful advantages, for example the uptake of carbon dioxide in a subsequent carbonation reaction is surprisingly facilitated, which further results in an improved filtration rate.

Accordingly, the present invention provides a process for the production of either an alkaline earth metal alkyl phenate or a sulphurised alkaline earth metal alkyl phenate which process comprises reacting at elevated temperature, in the presence or absence of sulphur, an alkyl phenol with an alkaline earth metal base in the presence as solvent of either an alkylene glycol alkyl ether or a polyalkylene glycol alkyl ether of formula:

$$R(OR^1)_xOR^2$$

wherein R is a $C_1$ to $C_6$ alkyl group, $R^1$ is alkylene, $R^2$ is hydrogen or $C_1$ to $C_6$ alkyl and x is an integer in the range 1 to 6, and as catalyst an inorganic halide.

The alkyl phenols suitable for use in the process of the invention may be represented by the general formula:

$$Ar(OH)(R^4)_n$$

wherein Ar represents an aromatic residue, $R^4$ is either a straight chain or a branched chain alkyl group containing at least four, preferably from 4 to 50, even more preferably from 8 to 25 carbon atoms and n is either 0 or an integer of 1 to 3. Typical alkyl phenols which may be used include, for example, phenol, butyl phenol, amyl phenol, octyl phenol, dioctyl phenyl, nonyl phenol, dinonyl phenol, dodecyl phenol, cetyl phenol and higher alkyl phenols in which the alkyl groups $R^4$ are derived from olefin polymers, such as, for example, polypropylene, polybutylene, or the like, and mixtures thereof. A particularly suitable alkyl phenol is the $C_{12}$-alkyl phenol obtained by alkylating phenol with propylene tetramer.

The alkaline earth metal base may suitably be an alkaline earth metal oxide or hydroxide. Of the alkaline earth metal oxide or hydroxide the hydroxide is preferred. Suitably the alkaline earth metal may be calcium, magnesium or barium. Calcium hydroxide may be added for example in the form of slaked lime. The alkaline earth metal base may either be added in an amount substantially equal to the stoichiometric amount required to neutralise the alkyl phenol, in which case the "normal" product will result or in excess, suitably greater than 20% by weight in excess, of the stoichiometric amount, in which case the "overbased" product will result. Generally, the amount of alkaline earth metal base added may be sufficient to provide the maximum amount possible consistent with retaining acceptable solubility in base oil. The alkaline earth metal base may be added wholly to the initial reactants or partially to the initial reactants and the remainder in one or more portions at an intermediate stage or stages in the process.

As solvent there is employed either an alkylene glycol alkyl ether or polyalkylene glycol alkyl ether of formula $$R(OR^1)_xOR^2$$

wherein R, $R^1$, $R^2$ and x have the aforesaid meanings. Preferably R is a $C_1$ to $C_4$ alkyl group, $R^1$ is ethylene, propylene or butylene, $R^2$ is hydrogen or $C_1$ to $C_4$ alkyl and x is an integer in the range 1 to 4. Suitable solvents include the monomethyl or dimethyl ethers of ethylene glycol, diethylene glycol, triethylene glycol or tetraethylene glycol. A particularly suitable solvent is methyl digol ($CH_3OCH_2CH_2OCH_2CH_2OH$). In admixture with the ether solvent there may suitably be employed a vicinal glycol, for example ethylene glycol or propylene glycol, in an amount up to 60% by weight of the solvent mixture. The total amount of solvent present may suitably be in the range from 0.1 to 2 moles, preferably from 0.5 to 1 mole, per mole of alkaline earth metal base.

As catalyst there is used an inorganic halide which may suitably be either a hydrogen halide, an ammonium halide or a metal halide. Suitably the metal moiety of the metal halide may be zinc, aluminium or an alkaline earth metal, preferably calcium. Of the halides the chloride is preferred. Suitable catalysts include hydrogen chloride, calcium chloride, ammonium chloride, aluminium chloride and zinc chloride. Suitably the amount of catalyst employed may be up to 2.0% w/w, for example from 0.4 to 0.9% w/w, though higher concentrations may be employed if so desired.

In one embodiment of the present invention an alkaline earth metal alkyl phenate is produced by omitting sulphur from the reactants.

In another embodiment a sulphurised alkaline earth metal alkyl phenate is produced by addition of sulphur to the reactants. The amount of sulphur added may suitably be sufficient to provide from 1 to 10, preferably from 2.5 to 5 wt % in the sulphurised alkaline earth metal alkyl phenate product. Generally, this amount will be in the range from 4 to about 15% by weight, based on the weight of the reaction mixture.

Whether the desired product is an alkyl phenate or a sulphurised alkyl phenate, it is preferred to carbonate at some stage in the process. The addition of carbon dioxide may be effected either at one or more intermediate points during the reaction or to the final product or both. The carbon dioxide may be added as a gas, a solid or a liquid and is preferably added as a gas, suitably be blowing it through the reaction mixture. The amount of carbon dioxide added may suitably be in the range from 10 to 300 mole %, preferably from 10 to 150 mole %, of the alkyl phenol employed. During carbonation it may be desirable, particularly when using relatively low-boiling solvents, to compensate for solvent losses by the addition of further solvent.

It is preferred to add a supplementary diluent either prior to, during the course of, or at the completion of the process so as to facilitate the handling of the reaction product. Although in theory any inert water-insoluble organic medium which does not react or interfere with the reaction may be used as the supplementary diluent, it is preferred to use a lubricating oil. Thus, by use of a lubricating oil, oil concentrates of the desired product can be obtained. Suitable lubricating oils include a wide variety of petroleum lubricating oils, such as naphthenic base, paraffin base and mixed base lubricating oils. Alternatively, synthetic lubricating oils, e.g. alkylene polymers, alkylene oxide polymers and carboxylic acid esters, may be employed. Suitably the lubricating oil may be a solvent neutral oil. The amount of supplementary diluent employed may suitably be within the range 10 to 60%, preferably 25 to 45% w/w of the reaction mixture.

Optionally a dispersant additive, such as a sulphonated dispersant, may be employed.

It is preferred to add a small amount, suitably up to 2% w/w, of an acid. The acid may be either a mineral acid or an organic acid. Suitable acids include for example formic acid, stearic acid, sulphonic acid, acetic acid, propionic acid, glycolic acid and dodecyl sulphonic acid. An important property of alkylphenates, particularly in marine lubricant applications, is their ability to minimise emulsion formation in water. In this respect it has been found that the addition of stearic acid or sulphonic acid to the reactants can enhance this property.

The elevated temperature may suitably be in the range 130 to 200, preferably from 145° to 174° C., and the pressure may suitably be atmospheric, superatmospheric or subatmospheric, preferably at or about atmospheric.

The process may be effected as a "single lime addition" or a "double lime addition" process. Suitably, the process of the invention may be carried out for example in the manner described in the complete specifications of British Patents Nos 900,059; 1121437 and 1144084. A preferred method of effecting the process of the invention comprises, in a first step, reacting at elevated temperature an initial mixture comprising the alkyl phenol, optionally sulphur, and a stoichiometric excess of an alkaline earth metal base in the presence of the ether solvent and catalyst to form an intermediate product and thereafter reacting the intermediate product in a second step with carbon dioxide.

The reaction temperature during the first step may suitably be in the range 130 to 200, preferably 145° to 175° C., and the pressure may be atmospheric, superatmospheric or subatmospheric, preferably about atmospheric. It is preferred to add the ether solvent when the temperature of the reaction mixture has attained a value within the aforesaid range. It is more preferred to add the solvent gradually over a period of from 0.5 to 3 hours whilst gradually raising the temperature.

In the second step of the process carbon dioxide is reacted with the intermediate product. The carbon dioxide is preferably introduced as a gas, suitably by blowing it through the reaction mixture. The reaction of the intermediate product with carbon dioxide may suitably be carried out at a temperature in the range 135° to 200° C. and at elevated, reduced or atmospheric pressure, preferably at a temperature in the range 145° to 175° C. at, or about, atmospheric pressure.

The process may be carried out batchwise or continuously. Preferably the process is carried out continuously with continuous recycle of recovered ether solvent.

Typically the batch process may be carried out by, in a first step, charging an initial mixture comprising a mineral lubricating oil, an alkaline earth metal hydroxide, catalyst, carboxylic acid and an alkyl phenol to a stirred reactor having overhead distillation and condensing facilities and heating at, or about, atmospheric pressure to a temperature in the range 135° to 200°, preferably 145° to 175° C., adding the ether solvent over a period of from 0.5 to 3 hours, whilst gradually raising the temperature within the aforesaid range, there being removed overhead water formed in the reaction, to produce an intermediate product and in a second step reacting the intermediate product from the first step with carbon dioxide at a temperature in the range 135° to 200°, preferably 145° to 175° C. at, or about atmospheric pressure.

In a more preferred embodiment of the invention an initial mixture comprising a mineral lubricating oil, an alkyl phenol, alkaline earth metal hydroxide, catalyst, carboxylic acid and ether solvent is continuously fed to a first stirred reactor maintained at a temperature in the range 135 to 200, preferably 145° to 175° C. and at, or about, atmospheric pressure, there being removed overhead water, to form an intermediate product which is passed continuously to a second stirred reactor maintained at a temperature in the range 135 to 200, preferably 145° to 175° C. and at, or about, atmospheric pressure wherein the intermediate product is reacted with carbon dioxide to form a carbonated product and in a final step the ether solvent is separated and recycled to the first stirred reactor.

Whichever procedure is employed, a product is obtained in admixture with ether solvent and possibly also lubricating oil diluent. It is therefore preferred to feed the admixture to a distillation column operating at reduced pressure and at a temperature such that ether solvent is removed as an overhead fraction and thereafter to filter the residual base product to remove insoluble matter therefrom. The distillation column may suitably be operated at a temperature of up to 200° C. and a pressure of 50 m bar. The residual base product may be filtered for example, at a temperature of about 120° C. and a pressure of about 90 psig. In a continuous process it is preferred to recycle the ether solvent removed by distillation to the first reactor.

Alternatively, the process of the invention may be effected by reacting at elevated temperature an alkyl phenol and a stoichiometric excess of an alkaline earth metal hydroxide in the presence of the ether solvent and catalyst, the alkaline earth metal hydroxide being added in two or more separate additions, and carbon dioxide being introduced into the reaction mixture either before and/or after each addition of alkaline earth metal hydroxide.

According to another aspect of the present invention there is provided a finished lubricating oil composition comprising an oil of lubricating viscosity and the product obtained as hereinbefore described.

The concentration of the product in the finished lubricating oil composition will vary depending upon the degree of overbasing in the product, the particular properties desired and the type of lubricating oil selected. Generally, however, the concentration of the product may be in the range from 0.5 to 80 weight per cent.

The oil of lubricating viscosity which may be employed in formulating the finished lubricant composition of the present invention may be selected from a wide variety of natural and synthetic oils such as naphthenic, paraffinic and mixed-base lubricating oils. The oils may suitably have a viscosity of 35 to 5,000 SUS at 100° F. or from 30 to 150 SUS (Saybolt Universal Seconds) at a temperature of 210° F.

Additionally the lubricating composition may contain other additives well-known in the art, such as VI improvers, antioxidants, rust inhibitors, antiwear agents, pour-point depressants etc.

The invention will now be further illustrated by reference to the following Examples.

EXAMPLE 1

A slurry comprising a mixture of 200 g methyl digol, 27.0 g sulphur, 90.0 g lime, 4.0 g acetic acid and 3.0 g calcium chloride was stirred and heated to 145° C./700 mmHg. 200 g dodecyl phenol (80% para isomer) was added in 15 minutes during which the temperature was increased to 165° C./700 mmHg and held for 3¼ hours. 33 g carbon dioxide was added at 165° C./1 bar. The temperature was increased to 200° C./10 mmHg during which 140 g lube oil was added and unreacted methyl digol recovered for recycle. Approximately 95% of the methyl digol charged was recovered. Filtration was rapid and gave a product containing 9.6% w/w Ca; 3.5% w/w S; 5.3% w/w $CO_2$ with a base number of 271 mg KOH/g.

COMPARISON TEST 1

A slurry comprising a mixture of 200 g dodecyl phenol (80% para isomer), 43.1 g overbased sulphurised calcium alkyl phenate, 33.6 g sulphur, 90.0 g lime and 158.4 g lube oil was stirred and heated to 145° C./700 mmHg. 45.1 g ethylene glycol was added in 15 minutes during which the temperature was raised to 165° C./700 mmHg and held for 3¼ hours. 40 g carbon dioxide was then added at 165° C./1 bar and unreacted ethylene glycol removed at 200° C./10 mmHg. Approximately 50% of the ethylene glycol charged was recovered for recycle. The filtered product contained 9.31% w/w Ca, 3.6% w/w S and 4.42% w/w $CO_2$. The product had a viscosity of 250 cSt at 100° C. and an Alkalinity Value (AV) of 250 mg KOH/g.

COMPARISON TEST 2

A slurry comprising a mixture of 200 g dodecyl phenol (80% para isomer), 18.0 g overbased sulphurised calcium alkyl phenate, 33.6 g sulphur, 89.0 g lime and 158.6 g lube oil was stirred and heated to 145° C./700 mmHg. 116 g methyl digol was added in 30 minutes during which the temperature was raised to 165° C./700 mmHg and held for 3¼ hours. 40 g carbon dioxide was then added at 165° C./1 bar and unreacted methyl digol removed at 200° C./10 mmHg. Greater than 95% of the methyl digol charged was recovered for recycle. The filtered product contained 4.06% w/w Ca, 4.67% w/w S and 1.72% w/w $CO_2$. The product had a viscosity of 31 cSt at 100° C. and an AV of 118 mg KOH/g.

COMPARISON TEST 3

The procedure of Comparison Test 2 was followed except that 4.0 g glacial acetic acid was included in the initial slurry charge. The filtered product contained 8.3% w/w Ca; 4.8% w/w S and 3.8% w/w $CO_2$. The product had a viscosity of 567 cSt at 100° C. and an AV of 247 mg KOH/g.

COMPARISON TEST 4

The procedure of Comparison Test 3 was followed except that sulphur, overbased sulphurised calcium alkyl phenate and lube oil were omitted from the initial slurry charge. The methyl digol charge was also reduced to 58.6 g. The filtered product contained 6.1% w/w Ca, 0.02% w/w S and 4.2% w/w $CO_2$. The product had a viscosity of 69 cSt at 100° C. and an AV of 161 mg KOH/g.

Comparison Tests 1 to 4 are not examples of the process of the invention and are included for comparison purposes only.

EXAMPLE 2

A slurry comprising 200 g methyl digol, 27 g sulphur, 90 g lime, 8 g glacial acetic acid and 1 g zinc chloride was heated to 165° C./700 mmHg and 200 g dodecyl phenol (80% para isomer) added during 10 minutes. The temperature was maintained for 3¼ hours, after which 50 g $CO_2$ was added at 165° C./1 bar. After the addition of 140 g lube oil, the unwanted solvent was removed at 200° C./10 mmHg. The filtered product contained 10.4% w/w Ca, 3.4% w/w S and 6.4% w/w $CO_2$. The product had a viscosity of 549 cSt at 100° C. and an AV of 287 mg KOH/g.

EXAMPLE 3

The procedure of Example 2 was followed except that the zinc chloride was replaced by calcium chloride (1 g). The filtered product contained 9.7% w/w Ca, 3.4% w/w S and 7.6% w/w $CO_2$. The product had a viscosity of 167 cSt at 100° C. and an AV of 272 mg KOH/g.

EXAMPLE 4

The procedure of Example 2 was followed except that the zinc chloride was replaced by ammonium chloride (3 g). The filtered product contained 10.0% w/w Ca, 3.1% w/w S and 4.6% w/w $CO_2$. The product had a viscosity of 201 cSt at 100° C. and an AV of 286 mg KOH/g.

EXAMPLE 5

The procedure of Example 2 was followed except that the zinc chloride was replaced by aluminium chloride (3 g). The filtered product contained 9.8% w/w Ca, 3.6% w/w S and 5.5% w/w $CO_2$. The product had a viscosity of 389 cSt at 100° C. and had an AV of 274 mg KOH/g.

EXAMPLE 6

The procedure of Example 3 was followed except that 200 g dodecyl phenol was added to the slurry and 200 g methyl digol added at 165° C./700 mmHg. The filtered product contained 10.1% w/w Ca, 3.6% w/w S and 5.8% w/w $CO_2$.

EXAMPLE 7

The procedure of Example 6 was followed except that the acetic acid was replaced by glycollic acid (4 g). The filtered product contained 8.8% w/w Ca, 3.4% w/w S and 6.4% w/w $CO_2$. The product had a viscosity of 152 cSt at 100° C. and an AV of 253 mg KOH/g.

EXAMPLE 8

The procedure of Example 6 was followed except that the acetic acid was replaced by formic acid (4 g). The filtered product contained 10.3% w/w Ca, 3.6% w/w S and 7.2% w/w $CO_2$. The product had a viscosity of 296 cSt at 100° C. and an AV of 293 mg KOH/g.

EXAMPLE 9

The procedure of Example 6 was followed except that acetic acid was replaced by propionic acid (4 g). The filtered product contained 9.8% w/w Ca, 3.5% w/w S and 5.2% w/w $CO_2$. The product had a viscosity of 312 cSt at 100° C. and an AV of 277 mg KOH/g.

EXAMPLE 10

A slurry containing a mixture of 150 g dodecyl phenol (80% para isomer), 27 g sulphur, 90 g lime, 4 g ammonium chloride, 4 g glacial acetic acid was heated to 165° C./700 mmHg. 200 g of methyl digol was added during 20 minutes and the temperature held at 165° C./700 mm Hg. for 3 hours. 35 g $CO_2$ was then added at 165° C./1 bar, followed by 140 g lube oil. Methyl digol was then removed at 200° C./10 mmHg. The filtered product contained 11.4% w/w Ca, 3.8% w/w S and 7.2% w/w $CO_2$. The product had a viscosity of 669 cSt at 100° C. and an AV of 320 mg KOH/g.

EXAMPLE 11

The procedure of Example 10 was repeated except that 120 g dodecyl phenol, 15 g sulphur and 95 g lime were used. The filtered product contained 12.7% w/w Ca, 2.7% w/w S and 8.8% w/w $CO_2$. The product had a viscosity of 438 cSt and an AV of 352 mg KOH/g.

EXAMPLE 12

The procedure of Example 11 was repeated except that the sulphur charge was reduced to 10 g. The filtered product contained 12.6% w/w Ca, 2.1% w/w S and 8.9% w/w $CO_2$. The product had a viscosity of 352 cSt at 100° C. and an AV of 357 mg KOH/g.

As mentioned hereinbefore, a desirable property of lubricating oil solutions of alkyl phenates is an ability to minimise emulsion formation with water. This is of particular relevance in marine oil formulations and is conveniently measured by the procedure of ASTM D1401, which measures the amount of water separated from an emulsified mixture of 40 $cm^3$ oil sample in 40 $cm^3$ water.

EXAMPLE 13

A slurry containing a mixture of 200 g dodecyl phenol (80% para isomer), 27 g sulphur, 90 g lime, 4 g glacial acetic acid and 3 g calcium chloride was stirred and heated to 165° C./700 mmHg. 200 g methyl digol was added over 20 minutes and the reaction maintained at 165° C./700 mmHg for 3 hours. 35 g $CO_2$ was added at 165° C./1 bar followed by 140 g lube oil. Methyl digol was removed at 200° C./10 mmHg. The filtered product contained 10.1% w/w Ca, 3.6% w/w S and 5.8% w/w $CO_2$. The product had a viscosity of 452 cSt at 100° C. and an AV of 290 mg KOH/g. The water separation by ASTM D1401 was 8 $cm^3$.

EXAMPLE 14

The procedure of Example 13 was repeated except that 10 g of stearic acid was included in the slurry charge. The filtered product contained 10.3% w/w Ca, 3.6% w/w S and 5.7% w/w $CO_2$. The product had a viscosity of 510 cSt at 100° C. and an AV of 286 mg KOH/g. The water separation by ASTM D1401 was 26 $cm^3$.

EXAMPLE 15

The procedure of Example 13 was repeated except that a mixture of 130 g lube oil and 10 g sulphonic acid was added after the carbonation step. The filtered product contained 9.6% w/w Ca, 3.5% w/w S and 6.1% w/w $CO_2$. The product had a viscosity of 335 cSt at 100° C. and an AV of 262 mg KOH/g. The water separation by ASTM D1401 was 33 $cm^3$.

EXAMPLE 16

The procedure of Example 13 was repeated except that the reaction period was reduced from 3 to 1 hour at 165° C./700 mmHg. The filtered product contained 9.9% w/w Ca, 3.6% w/w S and 5.9% w/w $CO_2$. The product had a viscosity of 383 cSt at 100° C. and an AV of 267 mg KOH/g. The water separation by ASTM D1401 was 20 $cm^3$.

EXAMPLE 17

The procedure of Example 13 was followed except that the reaction period was reduced from 3 hours to 5 minutes at 165° C./700 mmHg. The filtered product contained 9.9% w/w Ca, 3.7% w/w S and 5.6% w/w $CO_2$. The product had a viscosity of 390 cSt at 100° C. and an AV of 281 mg KOH/g. Water separation by ASTM D1401 was 25 $cm^3$.

EXAMPLE 18

The procedure of Example 13 was repeated except that the glacial acetic acid was omitted and replaced by 4 g ethylene glycol. The filtered product contained 9.8% w/w Ca, 3.6% w/w S and 5.6% w/w $CO_2$. The product had a viscosity of 380 cSt at 100° C. and had an AV of 277 mg KOH/g. Water separation by ASTM D1401 was 25 $cm^3$.

We claim:

1. a process for producing a sulphurised alkaline earth metal alkyl phenate comprising reacting at elevated temperature in the range 130° C. to 200° C., in the presence of sulphur, an alkyl phenol with an alkaline earth metal base in the presence as solvent of either an alkylene glycol alkyl ether or a polyalkylene glycol alkyl ether of formula:

$$R(OR^1)_xOR^2$$

wherein R is a $C_1$ to $C_6$ alkyl group, $R^1$ is alkylene, $R^2$ is hydrogen or $C_1$ to $C_6$ alkyl and x is an integer in the range 1 to 6 and employing as a catalyst an inorganic halide.

2. A process according to claim 1 wherein the alkaline earth metal base is added in an amount greater than 20% by weight in excess of the stoichiometric amount required to neutralise the alkyl phenol.

3. A process according to claim 1 wherein in the formula $R(OR^1)_xOR^2$, R is a $C_1$ to $C_4$ alkyl group, $R^1$ is ethylene, propylene or butylene, $R^2$ is hydrogen or $C_1$ to $C_4$ alkyl and x is an integer in the range 1 to 4.

4. A process according to claim 1 wherein the solvent of formula $R(OR^1)_xOR^2$ is the monomethyl or dimethyl ether of ethylene glycol, diethylene glycol, triethylene glycol or tetraethylene glycol.

5. A process according to claim 1 wherein the solvent of formula $R(OR^1)_xOR^2$ is admixed with up to 60% by weight of ethylene or propylene glycol.

6. A process according to claim 1 wherein the catalyst is a hydrogen halide, an ammonium halide, an alkaline earth metal halide, a zinc halide or an aluminum halide.

7. A process according to claim 6 wherein the catalyst is either hydrogen chloride, ammonium chloride, aluminum chloride, calcium chloride or zinc chloride.

8. A process according to claim 1 further comprising adding carbon dioxide either at one or more intermediate points during the reaction or to the final product or both during the reaction and to the final product.

9. A process according to claim 1 further comprising adding an acid to the reaction mixture.

10. A process according to claim 9 wherein the acid is formic acid, acetic acid, propionic acid, stearic acid, glycollic acid, sulphonic acid or dodecyl sulphonic acid.

11. A process according to claim 1 further comprising adding a supplemental diluent which is a lubricating oil.

12. A finished lubricating oil composition comprising an oil of lubricating viscosity and from 0.5 to 80 weight percent of a sulphurised alkaline earth metal alkyl phenate as obtained by the process claimed in claim 1.

13. A process for producing an alkaline earth metal alkyl phenate comprising reacting at elevated temperature in the range 130° C. to 200° C., in the absence of sulphur, an alkyl phenol with an alkaline earth metal base in the presence as solvent of either an alkylene glycol alkyl ether or a polyalkylene glycol alkyl ether of the formula:

$$R(OR^1)_xOR^2$$

wherein R is a $C_1$ to $C_6$ alkyl group, $R^1$ is alkylene, $R^2$ is hydrogen or $C_1$ to $C_6$ alkyl and x is an integer in the range 1 to 6 and employing as a catalyst an inorganic halide.

14. A finished lubricating oil composition comprising an oil of lubricating viscosity and from 0.5 to 80 weight percent of an alkaline earth metal alkyl phenate as obtained by the process claimed in claim 13.

15. A process according to claim 13 or 1 wherein the solvent is monomethyl ether of diethylene glycol.

16. A process according to claim 13 or 1, wherein the amount of catalyst employed is up to 2.0% w/w.

17. A process according to claim 16, wherein the amount of catalyst employed is from 0.4 to 0.9% w/w.

18. A process for producing a sulfurized alkaline-earth metal substituted phenate comprising reacting sulfur or a sulfur donating material and a detergent essentially consisting of a substituted phenol with an alkaline-earth metal base at a temperature in the range of about 50° C. to 300° C. wherein said reaction is carried out in the presence of a catalyst which comprises an inorganic acid or salt thereof and a solvent which is methyl digol.

19. A method for the preparation of an overbased sulfurized calcium phenate which comprises: (a) preparing a neutral sulfurized calcium phenate by the method which comprises selecting a phenolic composition from the group consisting of sulfurized hydrocarbyl-substituted phenols and mixtures of at least one hydrocarbyl-substituted phenol with a sulfur-donating material selected from the group consisting of sulfur monochloride, sulfur dichloride and elemental sulfur, and reacting said phenolic composition with a calcium base selected from the group consisting of calcium oxide and calcium hydroxide, wherein said reaction is carried out in the presence of a catalyst which comprises a monobasic inorganic acid or salt thereof, said reaction is carried out at a temperature in the range from about 50° C. to about 300° C. and the amount of said catalyst is from about 0.01 to about 0.3 mole per equivalent of phenolic oxygen; and (b) reacting the product of (a) with a calcium base selected from the group consisting of calcium oxide and calcium hydroxide, and treating the reaction mixture with carbon dioxide at least until the carbon dioxide absorption essentially stops, wherein said reaction of the product (a) is carried out in the presence of said catalyst at a temperature in the range from about 0° to about 300° C. wherein the amount of calcium base in steps (a) and (b) is 1.0 to 10 moles per equivalent of phenolic oxygen and the molar ratio of sulfur donating material to hydrocarbyl-substituted phenol is at least 0.5/1.0.

20. A process of making a neutral or normal sulfurized alkaline-earth metal substituted phenate by reacting either (i) a sulfurized hydrocarbyl substituted phenol or (ii) mixture of at least one hydrocarbyl substitute phenol and sulfur or a sulfur donating material with alkaline-earth metal base at a temperature in the range of 50° C. to 300° C. wherein the reaction is carried out in the presence of a catalyst which comprises an inorganic acid or salt thereof and in the absence of a carbonating agent such as $CO_2$.

* * * * *

UNITED STATES PATENT AND TRADEMARK OFFICE
CERTIFICATE OF CORRECTION

PATENT NO. : 5,330,665
DATED : July 19, 1994
INVENTOR(S) : Charles Cane, et al

It is certified that error appears in the above-indentified patent and that said Letters Patent is hereby corrected as shown below:

Claim 20, line 4, change "substitute" to -- substituted --.

Signed and Sealed this

Tenth Day of January, 1995

Attest:

BRUCE LEHMAN

Attesting Officer

Commissioner of Patents and Trademarks